Figure 1:
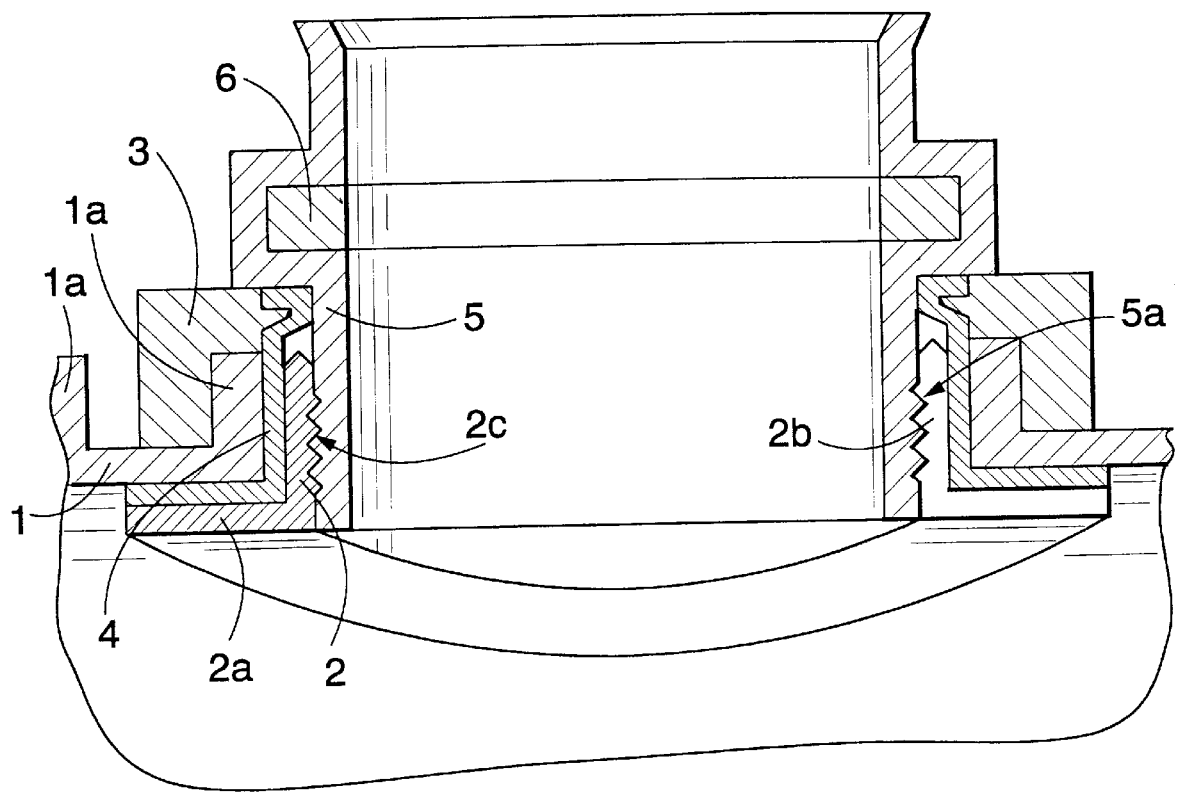

United States Patent
Järvenkylä

[19]
[11] Patent Number: 5,957,505
[45] Date of Patent: Sep. 28, 1999

[54] BRANCH PIPE CONNECTION

[75] Inventor: Jyri Järvenkylä, Hollola, Finland

[73] Assignee: Uponor Innovation AB, Fristad, Sweden

[21] Appl. No.: 09/158,635

[22] Filed: Sep. 22, 1998

Related U.S. Application Data

[60] Provisional application No. 60/062,840, Oct. 17, 1997.

[51] Int. Cl.⁶ ..................................................... F16L 41/08
[52] U.S. Cl. ........................ 285/125.1; 285/208; 285/212; 285/133.21
[58] Field of Search ................................ 285/125.1, 208, 285/212, 139.2, FOR 143, 133.21

[56] References Cited

U.S. PATENT DOCUMENTS

| | | | |
|---|---|---|---|
| 1,364,814 | 1/1921 | Saucke | 285/208 |
| 1,472,794 | 11/1923 | Foley | 285/208 |
| 1,542,645 | 6/1925 | Saucke | 285/208 |
| 1,745,941 | 2/1930 | Metcalf, Jr. | 285/208 |
| 1,745,954 | 2/1930 | Raybould | 285/208 |
| 1,758,387 | 5/1930 | Anderson | 285/208 |
| 2,079,991 | 5/1937 | Farrington | 285/208 |
| 2,132,636 | 10/1938 | Maahs | 285/208 |
| 4,627,648 | 12/1986 | Montpetit | 285/197 |

FOREIGN PATENT DOCUMENTS

| | | |
|---|---|---|
| 0268543 | 5/1988 | European Pat. Off. . |
| 0506181 | 9/1992 | European Pat. Off. . |
| 0623200 | 5/1997 | European Pat. Off. . |
| 71405 | 9/1986 | Finland . |
| 2264238 | 10/1975 | France ............................ 285/FOR 143 |
| 2557255 | 8/1986 | France . |
| 1315710 | 6/1987 | U.S.S.R. .................................. 285/208 |
| 485203 | 5/1938 | United Kingdom .................... 285/208 |
| 2120340 | 11/1985 | United Kingdom . |
| 9107619 | 5/1991 | WIPO . |
| 9510727 | 4/1995 | WIPO . |

Primary Examiner—Eric K. Nicholson
Attorney, Agent, or Firm—Ladas & Parry

[57] ABSTRACT

The present invention relates to a branch pipe connection for connecting a branch pipe to a lightly constructed underground sewage and drainage pipe. The connection includes a locking ring and a sleeve that are arranged against one another and can be tightened in their axial direction. The connection further includes a support flange. The locking ring has a slit by means of which the locking ring can be placed inside the underground sewage and drainage pipe through a hole made for the branch pipe from outside the underground sewage and drainage pipe. The pipe connection also comprises a sealing that is arranged to extend from the inner surface of the underground sewage and drainage pipe as far as the sleeve. A compact, dismountable connection for improving the ring stiffness of the underground sewage and drainage pipe is produced in this way.

5 Claims, 2 Drawing Sheets

BRANCH PIPE CONNECTION

This application claims the benefit of U.S. Provisional Application No.: 60/062,840 Oct. 17, 1997.

The invention relates to a branch pipe connection for connecting a branch pipe to a lightly constructed underground sewage and drainage pipe, which connection includes a bushing placed in a hole made in the underground sewage and drainage pipe, the smallest outer diameter of a flange of the bushing being larger than the largest diameter of the hole, a sealing for sealing the bushing against the underground sewage and drainage pipe, and a sleeve or a branch pipe arranged against the bushing.

WO Patent Application 91/07619 shows a connection for connecting a branch pipe to a sewage pipe. In the connection the end of the branch pipe is pushed inside the single branch to produce a telescopic connection. A sealing flange is arranged outside the connection and settled tightly by heating on top of a corrugated pipe, for example. At the connection point the ring stiffness of the sewage pipe is rather weak after the connection has been made. The connection is difficult to be produced and it cannot be easily dismounted subsequently.

European Patent Application 0 506 181 discloses a pipe connection where the pipe fitting is pushed to an opening made in a sewage pipe, where the end of the pipe fitting inside the sewage pipe is expanded. It is rather laborious and difficult to produce the connection and the connection cannot be dismounted subsequently. Even in this case the ring stiffness of the sewage pipe is rather weak at the connection point.

WO Patent Application 95/10727 shows a pipe connection used especially in association with relined sewage pipes. In the connection the single branch is pushed inside the sewage pipe and the flange is fused on the inner surface of the sewage pipe by electric heating. It is rather difficult to use the method and there may be problems with the durability of the connection under severe conditions. The ring stiffness of the sewage pipe cannot either be improved.

European Patent Application 0 268 543, U.S. Pat. No. 4,627,648, Finnish Patent 71,405 and French Patent 2,557, 255 disclose various pipe connections where a sleeve of the single branch is pushed inside a hole in the sewage pipe. All these connections have it in common that the flange of the single branch is sealed at its outer surface against the sewage pipe. The solutions are difficult in structure and they are not suitable for connecting a branch pipe to a lightly constructed underground sewage and drainage pipe.

European Patent Specification 0 623 200 shows a pipe connection where a branch pipe to be mounted at an oblique angle is connected to a pipe having a larger diameter. An aperture of elliptic shape is made in the pipe having a larger diameter, in which case the largest diameter of the aperture has to be larger than the smallest outer diameter of the flange of the branch pipe. In this way the aperture will be relatively large and thus the structure of the pipe, ring stiffness, for example, will weaken.

UK Patent 2 120 340 teaches a pipe joint where an inner part provided with a slit is first mounted through a hole made in the sewage pipe inside the sewage pipe. The joint further comprises an external flange and a shoulder to be screwed inside the inner part. The joint can also be made from outside the sewage pipe but it is only intended for inside sewage pipes having a smooth surface. Furthermore, as the joint is arranged to be sealed by means of the outermost flange to the outer surface of the sewage pipe, the joint cannot be applied to connect the branch pipe to a lightly constructed underground sewage and drainage pipe whose outer surface has a varying profile, because it is practically impossible to seal the surface by the sealing of the cited UK Patent. It is not useful to make a varying profile for the sealing because the shape of the required sealing would vary according to the location of the hole to be made. The use of silicone or other sealing compounds does not either ensure a sufficiently good result and it is also very difficult to use them.

It is an object of the present invention to produce a steady pipe connection for connecting a branch pipe to a lightly constructed underground sewage and drainage pipe.

The branch pipe connection of the invention is characterized in that the bushing and the sleeve or the branch pipe can be tightened against one another in their axial direction, that the bushing is formed by a locking ring having in its longitudinal direction over its entire length a slit for mounting the locking ring in the hole in the underground sewage and drainage pipe from outside the pipe, that the pipe connection has a support flange between the underground sewage and drainage pipe and the sleeve or a shoulder of the branch pipe, and that the sealing extends in an annular manner from inside the underground sewage and drainage pipe as far as the sleeve or the branch pipe.

An essential idea of the invention is that the connection includes a locking ring and a sleeve and a branch pipe which are arranged against one another and which can be tightened in their axial direction. The connection further includes a support flange to be placed outermost. A further essential idea is that the locking ring has a slit by means of which the locking ring can be placed inside the sewage pipe through the hole made for the branch pipe, although the smallest outer diameter of the flange of the locking ring is larger than the largest diameter of the hole made for the branch pipe. Another essential idea is that the pipe connection includes a sealing arranged to extend from the inner surface of the sewage pipe as far as the sleeve or the branch pipe.

An advantage of the invention is that the connection can be made to the sewage pipe from outside. A further advantage is that by means of the connection, the sewage pipe can be re-rounded and the ring stiffness of the sewage pipe can be improved at the same time. The hole made for the locking ring can be rather small. The connection also has a great bending stiffness. The connection can be further dismounted and lightly constructed underground sewage and drainage pipes can be sealed very simply with it.

In the present application, the term 'lightly constructed underground sewage and drainage pipe' refers to sewage pipes whose walls are provided for example with ribbed flanges or corrugation to improve ring stiffness of a sewage pipe to the effect that the actual wall of the sewage pipe is reasonably thin and the inner surface is substantially smooth, but because of ribbed flanges or corrugation its outer surface can have a varying profile. The pipe material can be plastic, concrete or clay or any other material suitable for the purpose.

The invention will be explained in more detail in the appended drawings where

Figure 2:
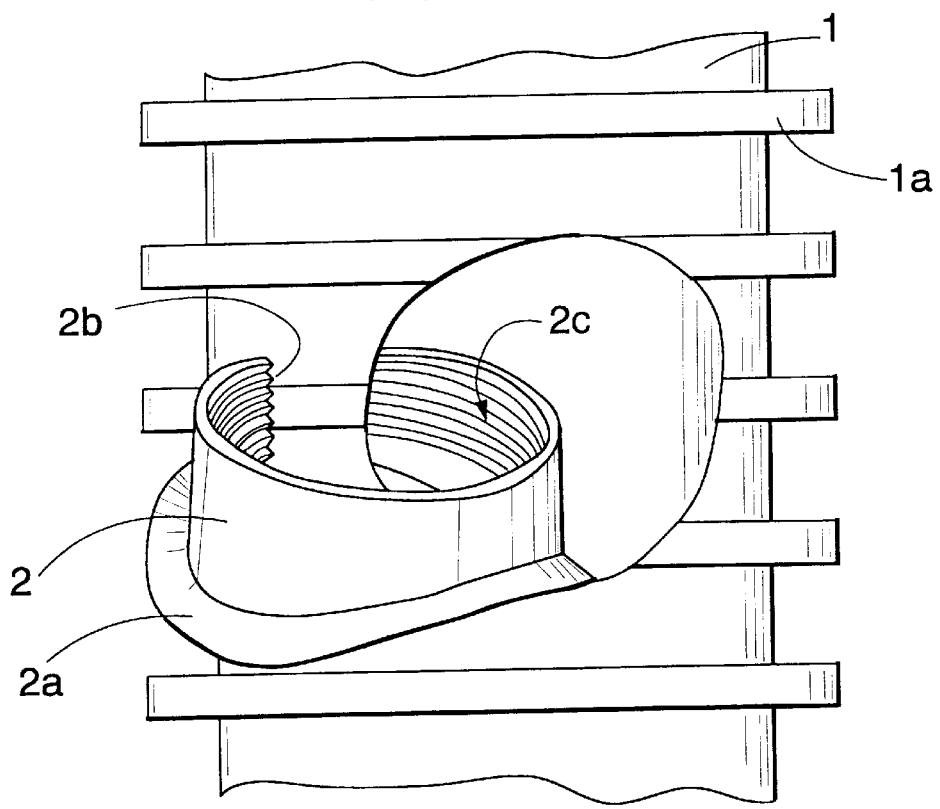
Figure 3:
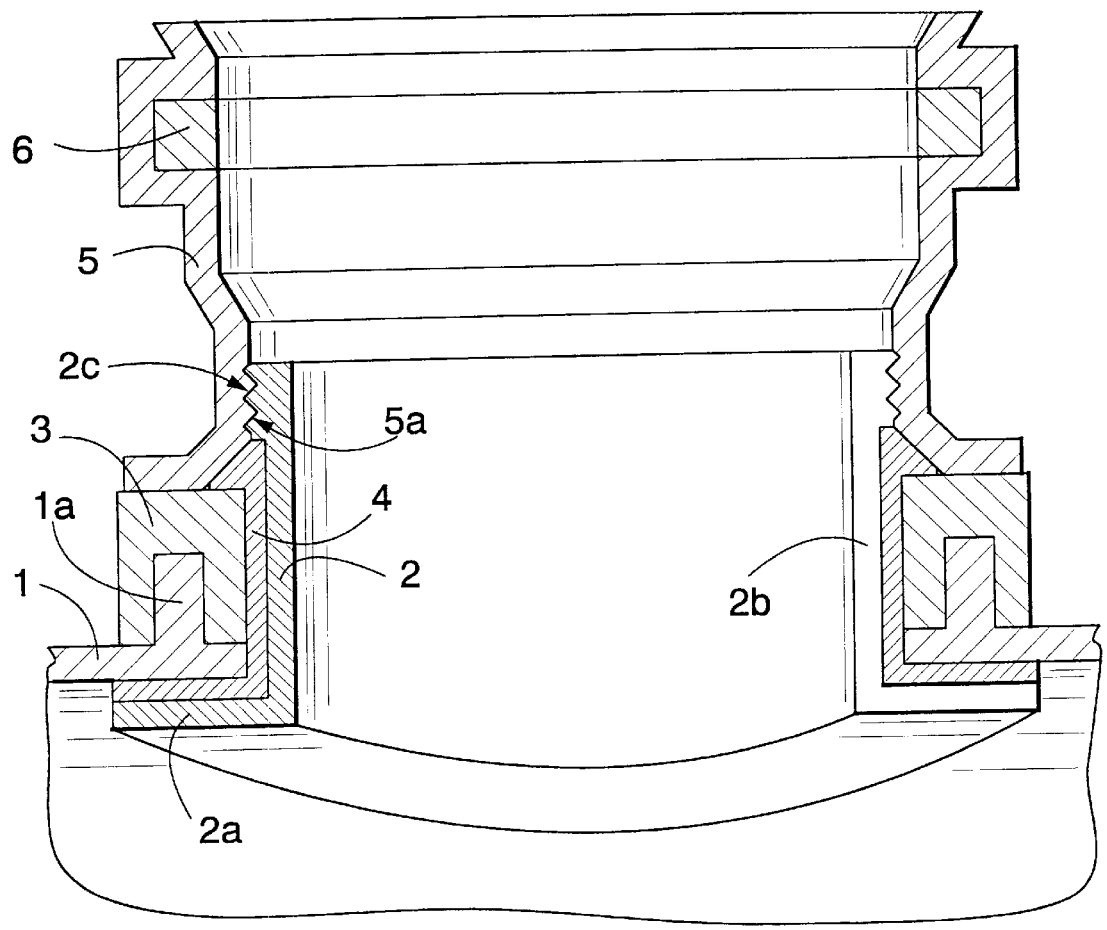

FIG. 1 is a schematic sectional side view of a pipe connection of the invention, FIG. 2 shows the mounting of a locking ring of the pipe connection of FIG. 1, and FIG. 3 is a schematic sectional side view of another pipe connection of the invention.

FIG. 1 shows a pipe connection made to a lightly constructed underground sewage and drainage pipe 1. The underground sewage and drainage pipe 1 has ribbed flanges 1a. The connection comprises a locking ring 2 which has a flange 2a in the end which is inside the underground sewage and drainage pipe 1. The outer diameter of the flange 2a is larger than the diameter of the hole made in the underground sewage and drainage pipe 1 for connecting the branch pipe. The hole can be round or it can be slightly elliptical in shape, for example, in which case the smallest outer diameter of the flange 2a of the locking ring 2 is larger than the largest diameter of the hole. For this reason the locking ring 2 has a slit 2b in the longitudinal direction of the locking ring 2 over its entire length, in which case the locking ring 2 can be mounted inside the underground sewage and drainage pipe 1 through a hole made therein as shown in FIG. 2. The locking ring 2 can be of a slightly flexible structure wherefore the slit 2b does not necessarily have to be of the width of the height of the wall and the ribbed flanges 1a of the underground sewage and drainage pipe 1, but when the locking ring 2 is mounted, the slit 2b can be spread slightly for the duration of mounting, when necessary.

After the locking ring 2 is mounted, a support flange 3 is mounted in the connection. After the support flange 3 is mounted, a sealing member 4 of rubber, for example, and after it a sleeve 5 are mounted. The locking ring 2 has internal threads 2c and the sleeve 5 similarly external threads 5a, in which case the sleeve 5 can be threaded inside the locking ring 2. The sleeve 5 includes a shoulder arranged to be pressed above the support flange 3, in which case when the sleeve 5 is threaded, it presses the support flange 3 against the underground sewage and drainage pipe 1 from outside and the locking ring 2 against the underground sewage and drainage pipe 1 from inside.

The sealing member 4 is arranged to be annular and extend from the inner surface of the underground sewage and drainage pipe 1 as far as the sleeve 5, in which case the pipe connection is sealed also at the slit 2b of the locking ring 2. The upper surface of the sealing member 4 against the sleeve 5 has a sliding surface, because of which when the sleeve 5 is threaded, it slides on the sealing member 4 without substantially clinging to it. The lower part of the sealing member 4 has a flange arranged against the inner surface of the underground sewage and drainage pipe 1.

The sleeve 5 is also provided with a recess to which a sealing member 6 is arranged for sealing the branch pipe inside the sleeve 5. The branch pipe is not shown in the accompanying figures for the sake of clarity.

FIG. 3 shows another pipe connection of the invention. The numbering in FIG. 3 corresponds to the numbering in FIGS. 1 and 2. The pipe connection of FIG. 3 corresponds to the pipe connection of FIG. 1 in other respects except that the locking ring 2 is arranged somewhat higher and the threads 2c are arranged on its outer surface. Correspondingly, the threads 5a to the sleeve 5 are arranged to the inner surface of the sleeve 5, in which case the sleeve 5 is threaded to the outside of the locking ring 2. The pipe connection is somewhat higher than the pipe connection of FIG. 1, but in the case of FIG. 3, the hole made in the underground sewage and drainage pipe 1 can be of the same size as the outer diameter of the branch pipe.

The lower part of the sealing member 4 has a similar flange as in the case of FIG. 1. At its upper end the sealing member 4 has a conical part with a sliding surface which allows the sleeve 5 to be rotated easily.

The drawing and the specification relating thereto are only intended to illustrate the idea of the invention. In its details, the invention can vary within the scope of the present claims. For this reason, the sleeve 5 is not necessarily required but instead, the end of the branch pipe can be formed to correspond to the shape of the sleeve 5 shown in the figure. The threads 2c and 5a can be omitted, when required, in which case any mechanical connection or an adhesive joint can be arranged in their place. The outer diameter of the sleeve 5 and the locking ring 2 can be clearly smaller than the diameter of the hole, in which case the fitting can be positioned into a suitable place with respect to the hole. In FIGS. 1 and 3, the sleeve 5 is drawn perpendicular with respect to the wall of the pipe 1. This is not necessary but the sleeve can also be at another angle, such as 30° or 45° with respect to the wall of the pipe 1. Most preferably the locking ring 2 is of stainless steel and the other parts of the connection are of plastic, but when required, all parts can be of any material suitable for the purpose.

I claim:

1. A branch pipe connection for connecting a branch pipe to a lightly constructed underground sewage and drainage pipe, which connection comprises:

a locking ring placed in a hole made in the underground sewage and drainage pipe, the smallest outer diameter of a flange of the locking ring being larger than the largest diameter of the hole, a sealing member for sealing the locking ring against the underground sewage and drainage pipe, and a sleeve or a branch pipe arranged against the locking ring, wherein the locking ring and the sleeve or the branch pipe can be tightened against one another in their axial direction, the locking ring having in its longitudinal direction over its entire length a slit for mounting the locking ring in the hole in the underground sewage and drainage pipe from outside the pipe, the pipe connection having a support flange between the underground sewage and drainage pipe and the sleeve or a shoulder of the branch pipe, and the sealing member extending in an annular manner from inside the underground sewage and drainage pipe to the sleeve or the branch pipe.

2. A branch pipe connection according to claim 1, wherein the sleeve or the branch pipe is arranged inside the locking ring.

3. A branch pipe connection according to claim 1, wherein the locking ring is arranged inside the sleeve or the branch pipe.

4. A branch pipe connection according to claim 1, wherein the locking ring and the sleeve or the branch pipe have threads for tightening the locking ring and the sleeve or the branch pipe against one another in their axial direction.

5. A connector for connection to a hole in a side of a first pipe, the connector comprising:

a locking ring having one axial end for locating in a hole in a side of a first pipe coaxially with the hole and an opposite axial end for projecting from the first pipe;

a flange on the one end of the locking ring, a smallest outer diameter of the flange being larger than a largest diameter of the hole;

a slit through the locking ring and flange defining a space in the longitudinal direction of the locking ring and flange over their entire radial lengths for the locating of the one end of the locking ring in the hole;

a sleeve or branch pipe end having an external shoulder;

a sealing member between the flange and an inside of the first pipe and extending to the sleeve or branch pipe end; and a support flange between the shoulder of the sleeve or branch pipe end and an outside of the first pipe, wherein at least one of the locking ring and sleeve or branch pipe end have an interconnection structure for tightening to the other, whereby to press the sealing member and support flange against the first pipe.

* * * * *